(12) United States Patent
Izawa (10) Patent No.: US 6,483,786 B1
(45) Date of Patent: Nov. 19, 2002

(54) LIGHT GUIDE PATH ELEMENT AND OPTICAL PICKUP

(75) Inventor: Masataka Izawa, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/497,409

(22) Filed: Feb. 3, 2000

(30) Foreign Application Priority Data

Feb. 3, 1999 (JP) .............................................. 11/26235

(51) Int. Cl.$^7$ .......................... G11B 7/135; G11B 7/095
(52) U.S. Cl. .............................. 369/44.12; 369/112.07; 369/112.09; 369/112.12; 369/112.14
(58) Field of Search ............................. 369/44.12, 120, 369/112.07, 112.09, 112.12, 112.14, 112.27

(56) References Cited

U.S. PATENT DOCUMENTS

| 5,481,516 A | * | 1/1996 | Kim ........................ 369/44.12 |
| 5,583,843 A | * | 12/1996 | Horinouchi .................. 369/103 |
| 5,835,472 A | * | 11/1998 | Horie et al. ................. 369/110 |
| 6,314,063 B1 | * | 11/2001 | Nemoto ................... 369/44.12 |

* cited by examiner

Primary Examiner—W. R. Young
Assistant Examiner—Gautam R. Patel
(74) Attorney, Agent, or Firm—Young & Thompson (57) ABSTRACT

A light guide path element is provided with: a first light guide path for guiding a light beam having a first wavelength; a second light guide path for guiding a light beam having a second wavelength; a first separating device for irradiating the light beam having the first wavelength irradiated from a first light source onto an information record medium and transmitting a light beam reflected therefrom; a second separating device for irradiating the light beam having the second wavelength irradiated from a second light source onto an information record medium and transmitting a light beam reflected therefrom; a first grating for input-coupling one portion of the light beam transmitted through the first separating device to the first light guide path and transmitting another portion of the light beam transmitted through the first separating device; a second grating for input-coupling one portion of the light beam transmitted through the second separating device to the second light guide path and transmitting another portion of the light beam transmitted through the second separating device; a first light receiving portion for receiving the light beam transmitted through the first grating or the second grating; a second light receiving portion for receiving the light beam guided by the first light guide path; and a third light receiving portion for receiving the light beam guided by the second light guide path.

12 Claims, 6 Drawing Sheets

OFF TRACK   ON TRACK   OFF TRACK

LIGHT GUIDE PATH ELEMENT AND OPTICAL PICKUP

BACKGROUND OF THE INVENTION

1. Field of the Invention

The present invention generally relates to an optical pickup having a light guide path element in which a light guide path is laminated on a substrate, and more particularly to an optical pickup which can commonly use two wavelengths different from each other.

2. Description of the Related Art

Recently, in addition to a CD (Compact Disc) or CD-R (CD-Readable), which have been conventionally utilized as an optical disc, a DVD is getting popular which can improve the record density, so that the usage of the optical pickup necessary for those different types of discs becomes various. While the CD or the CD-R utilizes a laser light whose wavelength is about 780 nm, the DVD utilizes a laser light whose wavelength is about 650 nm. Thus, different optical pickups are employed for those different wavelengths. In order to reduce the cost and miniaturize the apparatus, an optical pickup is desired which can be commonly used for the CD or CD-R and the DVD.

However, there is a problem that a structure of an optical system in the above-mentioned desired optical pickup commonly usable for two different wavelengths becomes complicated, resulting in that the cost is increased and the miniaturization of the optical pickup becomes difficult.

On the other hand, a light guide path element, to which the integrated circuit technology is adapted, is being developed nowadays. If such a light guide path element is adapted to the optical pickup, since elements having various functions can be integrated in a multiple-layered structure, it is possible to realize an optical pickup which is small and reliable.

However, in case that an optical pickup usable for two different wavelengths is constituted by using such a light path element, since the light sources for the respective wavelengths are disposed separately, it is difficult to couple and transmit the light beams, which are emitted from respective light sources, and to irradiate the light beams onto an information record medium through a common optical system. Furthermore, in case of reproducing the CD or DVD, it is necessary to perform the focusing servo control and the tracking servo control. These servo controls may not be always the same for various types of the discs such as the CD and the DVD. For example, as for the tracking servo control, the 3-beams method may be employed for the CD while the ordinary phase different method may be employed for the DVD. In such a case, the structure of the grating and the light receiving portions become complicated, resulting in that it is difficult to couple them with the light guide path element.

SUMMARY OF THE INVENTION

It is therefore an object of the present invention to provide a light guide path element, which can be commonly used for information record mediums corresponding to two different wavelengths, can have a rather simple structure and can be rather easily miniaturized, and also provide an optical pickup having such an optical guide path element.

The above object of the present invention can be achieved by a light guide path element provided with: a first light guide path for guiding a light beam having a first wavelength; a second light guide path for guiding a light beam having a second wavelength; a first separating device for irradiating the light beam having the first wavelength irradiated from a first light source onto an information record medium and transmitting a light beam reflected therefrom; a second separating device for irradiating the light beam having the second wavelength irradiated from a second light source onto an information record medium and transmitting a light beam reflected therefrom; a first grating for input-coupling one portion of the light beam transmitted through the first separating device to the first light guide path and transmitting another portion of the light beam transmitted through the first separating device; a second grating for input-coupling one portion of the light beam transmitted through the second separating device to the second light guide path and transmitting another portion of the light beam transmitted through the second separating device; a first light receiving portion for receiving the light beam transmitted through the first grating or the second grating; a second light receiving portion for receiving the light beam guided by the first light guide path; and a third light receiving portion for receiving the light beam guided by the second light guide path.

According to the light guide path element of the present invention, the light beam having the first wavelength is emitted from the first light source, and is irradiated onto the information record medium by the first separating device. Then, the reflected light beam is transmitted through the first separating device and reaches the first grating. Then, one portion of this light beam is input-coupled to the first wave guide path while another portion of this light beam is transmitted and is received by the first light receiving portion. The light beam guided by the first wave guide path is received by the second light receiving portion.

On the other hand, the light beam having the second wavelength is emitted from the second light source, and is irradiated onto the information record medium by the second separating device. Then, the reflected light beam is transmitted through the second separating device and reaches the second grating. Then, one portion of this light beam is input-coupled to the second wave guide path while another portion of this light beam is transmitted and is received by the first light receiving portion. The light beam guided by the second wave guide path is received by the third light receiving portion.

Therefore, it is possible to irradiate the light beams having two different wavelengths onto the information record medium and guide the light beams by the different wave guide paths respectively, so that a light guide path element commonly usable for the two wavelengths (e.g., for the CD or the DVD), which is suitable for miniaturization and whose structure is simplified, can be realized.

In one aspect of the light guide path element of the present invention, at least one of the first separating device and the second separating device is provided with a light guide path having a grating for input-coupling the light beam and a grating for output-coupling the light beam so as to irradiate the light beam onto the information record medium.

According to this aspect, at least one of the first separating device and the second separating device input-couples the light beam from the light source by one grating and, after the light beam is guided by the light guide path, irradiates the light beam onto the information record medium by another grating. Therefore, regardless of the position of the information record medium, by designing one grating for input-coupling in correspondence with the position of the light source and also designing another grating for output-coupling in correspondence with the optical axis of the light beam, a light guide path element commonly usable for the two wavelengths, whose degree of freedom as for the arrangement is high and whose structure is rather simple and suitable for the miniaturization, can be realized.

In another aspect of the light guide path element of the present invention, at least one of the first separating device and the second separating device is provided with a separation film laminated on the first and second light guide paths for selectively reflecting and transmitting the light beam in correspondence with a phase difference given to the light beam.

According to this aspect, one of the first separating device and the second separating device reflects the light beam from the light source by the separation film, which is laminated on the light guide path element, toward the information record medium, and transmits the reflected light beam while giving the phase difference to the reflected light beam. Therefore, it is possible to construct the separating device without equipping the light guide path or the grating, so that a light path element commonly usable for the two wavelengths, whose structure is rather simple and suitable for the miniaturization, can be realized.

In another aspect of the light guide path element of the present invention, the first separating device generates three beams by diffracting the light beam having the first wavelength so that a tracking error signal is generated by use of the three beams on the basis of a light reception output of the third light receiving portion.

According to this aspect, when the light beam having the first wavelength is inputted to the first separating device, it is diffracted so that the three beams are generated in the light guide path surface. Then, the tracking error signal is generated on the basis o the light reception output of the third light receiving portion by use of those three light beams. Therefore, a light path element commonly usable for the two different wavelengths, which can easily perform the tracking error detection by means of the 3-beams method typically used for the CD, can be realized.

In another aspect of the light guide path element of the present invention, each of the first grating and the second grating are divided into two areas so that a focus error signal is generated by a beam size method by the light beam transmitted through one of the two areas and the light beam transmitted through another of the two areas at the second light receiving portion and the third light receiving portion.

According to this aspect, the light beam having the first wavelength is transmitted through the first grating which is divided into two areas, so that the focus error signal by means of the beam size method is generated in the second light receiving portion. The light beam having the second wavelength is transmitted through the second grating which is divided into two areas, so that the focus error signal by means of the beam size method is generated in the third light receiving portion. Therefore, a light guide path element, which can cope with the focus error detection for the optical disc, by designing the grating pattern, can be realized.

In another aspect of the light guide path element of the present invention, the first wavelength is 650 nm and the second wavelength is 780 nm.

According to this aspect, the light beam having the wavelength of 650 nm for the DVD and the light beam having the wavelength of 780 nm for the CD or the CD-R can be commonly used. Therefore, a light guide path element commonly usable for the DVD and the CD i.e., the typical optical discs capable of high density recording, whose structure is rather simple and suitable for the miniaturization, can be realized.

The above object of the present invention can be also achieved by an optical pickup having the above described light guide path element of the present invention (including the various aspects thereof, wherein an RF signal is generated on the basis of a light reception output of the first light receiving portion, and a focus error signal is generated on the basis of a light reception output of the second light receiving portion and a light reception output of the third light receiving portion.

According to the optical pickup of the present invention, the light beam having the first wavelength is emitted from the first light source, and is irradiated onto the information record medium by the first separating device. Then, the reflected light beam is transmitted through the first separating device and reaches the first grating. Then, one portion of this light beam is input-coupled to the first wave guide path while another portion of this light beam is transmitted and is received by the first light receiving portion. The light beam guided by the first wave guide path is received by the second light receiving portion. Then, the RF signal is generated on the basis of the light reception output of the first light receiving portion while the focus error signal is generated on the basis of the light reception output of the second light receiving portion.

On the other hand, the light beam having the second wavelength is emitted from the second light source, and is irradiated onto the information record medium by the second separating device. Then, the reflected light beam is transmitted through the second separating device and reaches the second grating. Then, one portion of this light beam is input-coupled to the second wave guide path while another portion of this light beam is transmitted and is received by the first light receiving portion. The light beam guided by the second wave guide path is received by the third light receiving portion. Then, the RF signal is generated on the basis of the light reception output of the first light receiving portion while the focus error signal is generated on the basis of the light reception output of the third light receiving portion.

Therefore, it is possible to irradiate the light beams having two different wavelengths onto the information record medium and guide the light beams by the different wave guide paths respectively, so that an optical pickup commonly usable for the two wavelengths (e.g., for the CD or the DVD), which is suitable for miniaturization and whose structure is simplified, can be realized.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENT

Referring to the accompanying drawings, an embodiment of the present invention will be now explained. In the present embodiment, the present invention is applied to a light guide path device for an optical pickup commonly usable for the CD and the DVD.

Figure 1:
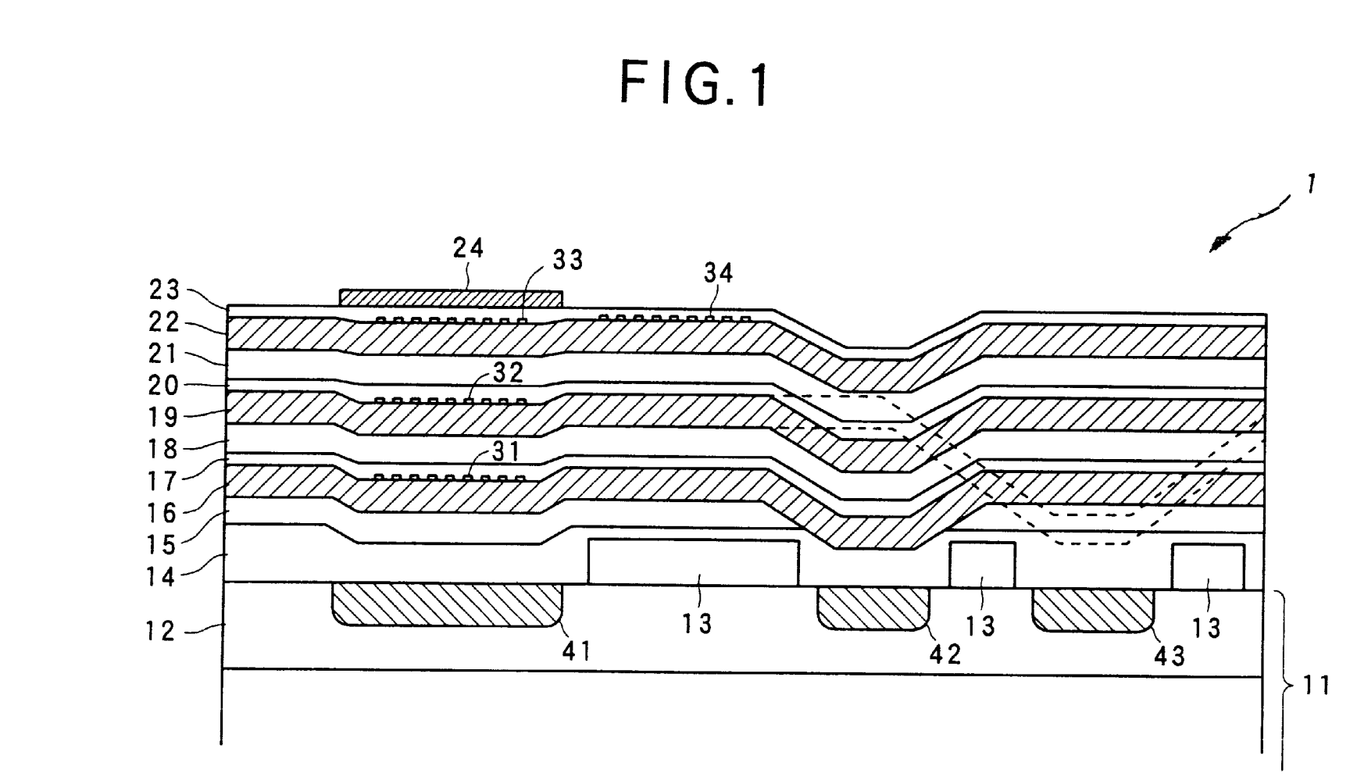
FIG. 1 is a sectional view of a light guide path device of an embodiment according to the present invention.

FIG. 1 is a sectional view showing the cross-sectional structure of an optical guide path device of the present embodiment.

In FIG. 1, an optical guide path device 1 is provided with a semiconductor substrate 11, and in an order form the bottom side, an epitaxial layer 12, an aluminum shading film 13, a first SOG (Spin On Glass) layer 14, a first $SiO_2$ layer 15, a first wave guide layer 16, a second SOG layer 17, a second $SiO_2$ layer 18, a second wave guide layer 19, a third SOG layer 20, a third $SiO_2$ layer 21, a third wave guide layer 22, a fourth SOG layer 23, an outward-path/inward-path separation film 24 are laminated on the semiconductor substrate 11. On the left upper side of each of the first wave guide layer 16, the second wave guide layer 19 and the third wave guide layer 22 in FIG. 1, a first grating 31, a second grating 32 and a third grating 33 are formed respectively. On the central upper side of the third wave guide layer 22, a fourth grating 34 is formed. Further, on the epitaxial layer 12, a first light receiving portion 41, a second light receiving portion 42 and a third light receiving portion 43 are formed in this order from a left hand side in FIG. 1.

In the structure described above, an N type silicon substrate may be employed as the semiconductor substrate 11, for example. On the semiconductor substrate 11, a monocrystal silicon film is developed by the epitaxial growing technique to form the epitaxial layer 12. Then, a P type diffusion is applied for such a predetermined arrangement hat the first light receiving portion 41, the second light receiving portion 42 and the third light receiving portion 43 are formed by the P type diffusion. On the upper side of the area where those light receiving portions are not formed, the aluminum layer 13 is formed, so as to shade a light from the upper side thereof.

Each of the first SOG layer 14, the second SOG layer 17, the third SOG layer 20 and the fourth SOG layer 23 functions as a buffer layer in the multiple-layered structure. The second SOG layer 17, the third SOG layer 20 and the fourth SOG layer 23 are respectively formed above the first wave guide layer 16, the second wave guide layer 19 and the third wave guide layer 22. On the other hand, the first SOG layer 14 is formed above the aluminum shading film 13 and has a role to bury the stage difference caused above the respective light receiving portions 41 to 43. The thickness of each of the SOG layers 14, 17, 20 and 23 may be freely changed depending upon the structure of the upper and lower layers and the condition of the film formation.

Each of the first wave guide layer 16, the second wave guide layer 19 and the third wave guide layer 22 is formed of CORNING 7059 (Trade Name) to have a film thickness of 0.65 $\mu$m, and functions as a light guide path to transmit the light beams, which are input-coupled through the first grating 31, the second grating 32 and the fourth grating 34 respectively, at the wave guide mode.

Each of the first grating 31, the second grating 32, the third grating 33 and the fourth grating 34 are formed of $TiO_2$ to have a film thickness of 0.1 $\mu$m. A predetermined grating pattern is formed in each of those gratings so as to function as a coupler for input-combining or output-combining the light beams corresponding to the later described wavelength.

Each of the first $SiO_2$ layer 15, the second $SiO_2$ layer 18 and the third $SiO_2$ layer 21 is formed of $SiO_2$ below the first wave guide layer 16, the second wave guide layer 19 and the third wave guide layer 22 respectively to have a film thickness of 0.7 $\mu$m and functions as a clad layer for the light guide path.

In the above described structure, it is desired to set each appropriate refractive index so as to couple the light beams with the light guide path appropriately and to transmit the coupled light beams efficiently at the wave guide mode. More concretely, in the present embodiment, each of the first to third wave guide layers 16, 19 and 22 has a refractive index of 1.53, each of the $SiO_2$ layers 15, 18 and 21 has a refractive index of 1.47, each of the SOG layers 14, 17, 20 and 23 has a refractive index of 1.43, and each of the gratings 31 to 34 has a refractive index of 2.0, for example.

After polishing a surface of the fourth SOG layer 23, the outward-path/inward-path separation film 24 is film-formed at the left upper portion in FIG. 1, by vapor-depositing technique. The outward-path/inward-path separation film 24 comprises a multiple-layered structure such as a dielectric layers, and functions as a beam splitter as described later in detail.

Next, a case in which the light guide path device 1 shown in FIG. 1 is used as an optical pickup will be explained. The optical pickup in the present embodiment can be used for either the wavelength of 780 nm for the CD and the wavelength of 650 nm for the DVD. Namely, it functions as an optical pickup commonly usable for the two different wavelengths.

Figure 2:
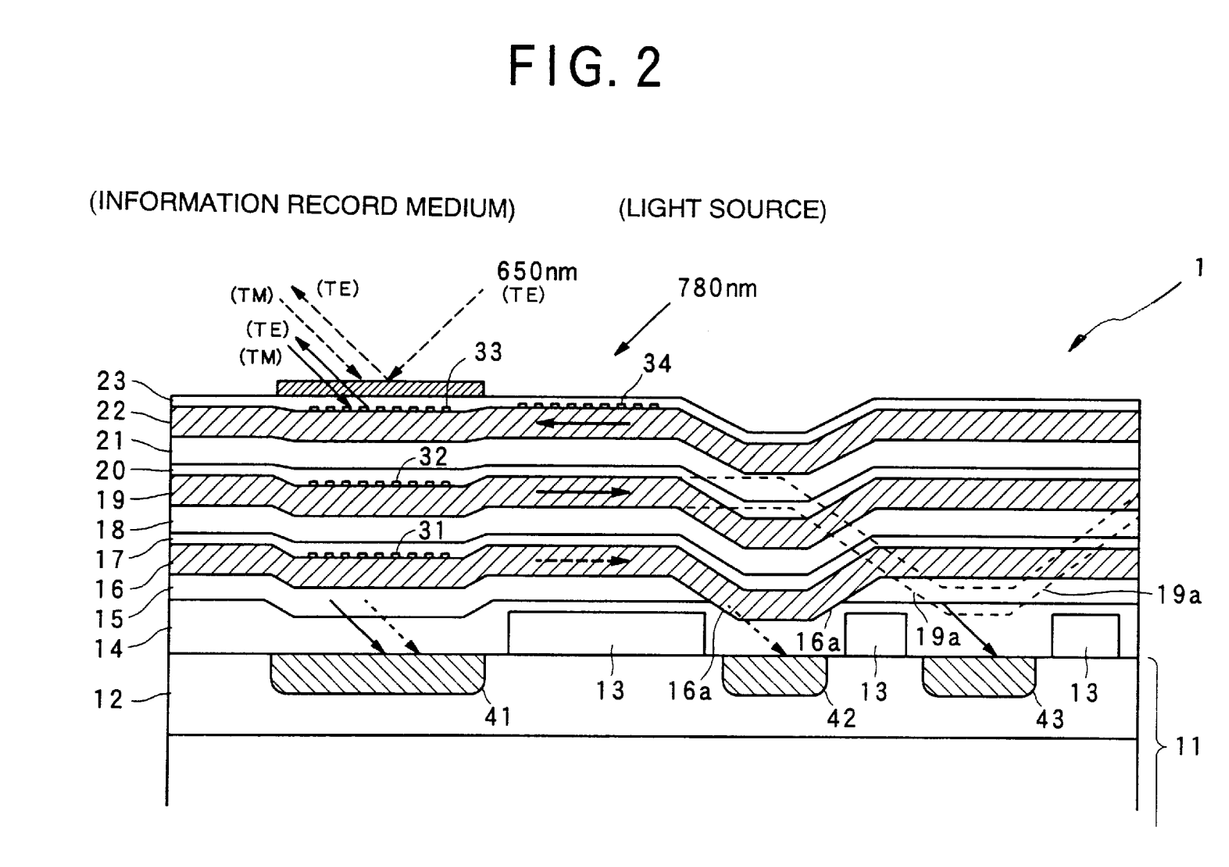
FIG. 2 is a sectional view of the light guide path device of the embodiment, in which optical paths of light beams having wavelengths of 780 nm and 650 nm respectively are illustrated.

FIG. 2 shows the advance directions and the optical paths of the light beams having the wavelengths of 780 nm and 650 nm respectively, in the cross-sectional structure of the light guide path device 1. In FIG. 2, the advance direction of the light beam having the wavelength 780 nm is indicated by a solid line arrow while that of the light beam having the wavelength 650 nm is indicated by a dotted line arrow.

In FIG. 2, the light beam having the wavelength 650 nm is inputted in an oblique direction from the light source, which is disposed at a predetermined position, to the outward-path/inward-path separation film 24. In order to make the outward-path/inward-path separation film 24 function as the first separating device for the light beam having the wavelength 650 nm, the outward-path/inward-path separation film 24 is adjusted to have such an optical characteristic to reflect the light beam at the TE mode while transmit the light beam at the TM mode. Further, it is adjusted such that the light beam at the TE mode is inputted thereto in the oblique direction. By those, the light beam having the wavelength of 650 nm at the TE mode is once reflected by the outward-path/inward-path separation film 24, and is collected onto the information record surface of the DVD through the optical system not illustrated. At this time, by disposing the λ/4 wavelength plate in the optical path to thereby change the light beam at the TE mode to the light at the TM mode, the reflected light at the TM mode is transmitted through the outward-path/inward-path separation film 24.

Then, the light beam is transmitted downward through the third grating 33 and the second grating 32, and is partially input-coupled to the first wave guide layer 16 by the first grating 31. This is because, the third grating 33 and the second grating 32 are used as a coupler for the light beam having the wavelength of 780 nm, the first grating 31 functions as the coupler for input-coupling the light beam having the wavelength of 650 nm. A curved grating, which is a chirped grating, formed in the first grating 31 such that the pitch and the curvature of the grating pattern therein is adjusted finely in accordance with the irradiation condition and the focal position of the converged light beam having the wavelength of 650 nm. Additionally, the height of the grating structure is appropriately adjusted so that the light beam having the wavelength of 650 nm is coupled to the first wave guide layer 16 at a desired coupling efficiency.

The light beam having the wavelength of 650 nm is partially transmitted through the first grating 31 to reach the first light receiving portion 41, and is partially input-coupled to the first wave guide layer 16 and is transmitted rightward at the wave guide mode 5 to reach the second light receiving portion 42. In the present embodiment, at the time of the DVD operation, the detection of the RF signal and the detection of the tracking error signal are performed by the first light receiving portion 41 while the focus error detection is performed by the second light receiving portion 42, which will be described later in detail.

Next, in FIG. 2, the light beam having the wavelength 780 nm is inputted in an oblique direction from the light source, which is disposed at a predetermined position, to the fourth grating 34. The fourth grating 34 functions as a coupler for input-coupling the light beam having the wavelength of 780 nm at the TE mode to the third wave guide layer 22. At this time, in order to perform the tracking error detection by means of the 3-beams method at the time of the CD operation, the later described grating pattern is formed in the fourth grating 34 so as to generate the diffracted light corresponding to the 3-beams.

The input-coupled light beam is transmitted at the wave guide mode leftward through the third wave guide layer 22 and reaches the third grating 33. The third grating 33 functions as a coupler for output-coupling the light beam having the wavelength of 780 nm at the TE mode, and the light beam is irradiated from the third grating 33 in a predetermined direction, is transmitted through the outward-path inward-path separation film 24 and is collected onto the information record surface of the CD through the optical system not illustrated. The third grating 33 collects the output-coupled light, which has a light amount distribution in an exponential-function manner, to be a collected light having the distribution similar to the Gauss distribution. For this purpose, the third grating 33 has such a grating structure which changes the height in a step like manner.

In this manner, the fourth grating 34 and the third grating 33 function together as the second separating device for the light beam having the wavelength of 780 nm.

Then, the light beam, which is reflected from the information record surface and whose mode has been changed form the TE mode to the TM mode, is transmitted through the outward-path/inward-path separation film 24 and the third grating 33, and is input-coupled by the second grating 32, which functions as a coupler for input-coupling the light beam having the wavelength of 780 nm, to the second wave guide layer 19 at a desired coupling efficiency.

Therefore, one portion of the light beam having the wavelength of 780 nm is transmitted through the second grating 32 and reaches the first light receiving portion 41. The other portion of the light beam having the wavelength of 780 nm is input-coupled to the second wave guide layer 19, is transmitted rightward direction at the wave guide mode and reaches the third light receiving portion 43. In the present embodiment, at the time of CD operation, the detection of the RF signal is performed by the first light receiving portion 41, while the tracking error detection and the focus error detection are performed by the third light receiving portion 43 are performed by the third light receiving portion, which will be described later in detail.

Here, as shown in FIG. 2, the first wave guide layer 16 and the second light receiving portion 42 are disposed close to each other, while the second wave guide layer 19 and the third light receiving portion 43 are disposed close to each other. This is because, in order to obtain the high light receiving efficiency, it is necessary to change the wave guide mode to the irradiation mode before receiving the light. Thus, those are disposed so as to reduce the distance between the wave guide layer and the light receiving portion. Therefore, a stage difference is caused between the first wave guide layer 16 and the second wave guide layer 19, so that the slope portions 16a and 19a are respectively formed in the vicinity of the second light receiving portion 42 and the third light receiving portion 43. Since the shape of the second wave guide layer 19 is designed in line with the slope portion 16a of the first wave guide layer 16, the slope portion 19a is formed as indicated by the dotted line in FIG. 2. Viewing from the upper portion of the light guide path device 1, the slope portion 16a is disposed at a central portion while slope portions 19a are disposed at the both end portions respectively, so as not to interfere with each other.

The light guide path device 1 shown in FIG. 2 is integrated with the sub-mount for the light source and is set so as to have a predetermined positional relationship with the information record medium and the optical system. In this optical system, in addition to the above mentioned λ/4 wavelength plate, there is equipped an objective lens, a collimator lens, a reflection mirror etc., for collecting the light beam onto the information record medium.

Figure 3A:
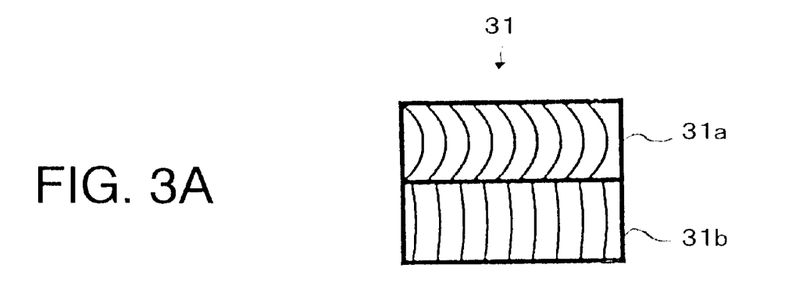
FIG. 3A is a plan view of one grating in the optical guide path device of the embodiment.
Figure 3B:
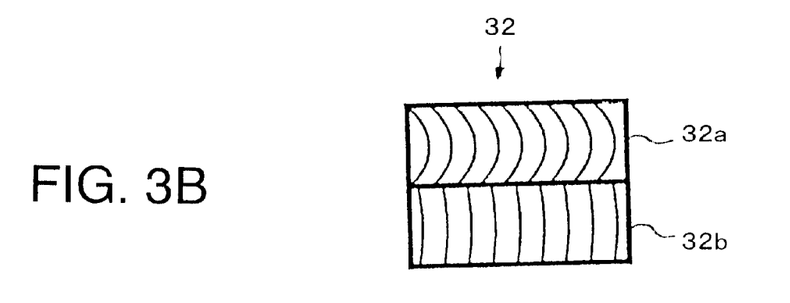
FIG. 3B is a plan view of another grating in the optical guide path device of the embodiment.
Figure 3C:
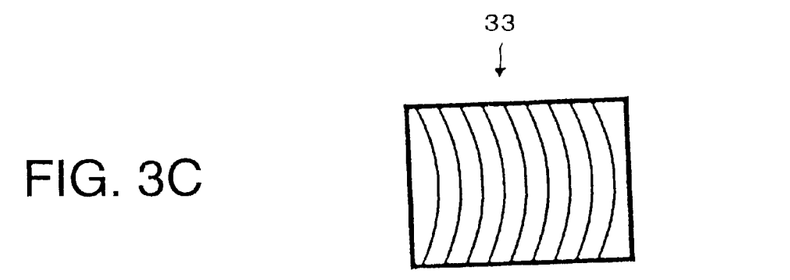
FIG. 3C is a plan view of another grating in the optical guide path device of the embodiment.
Figure 3D:
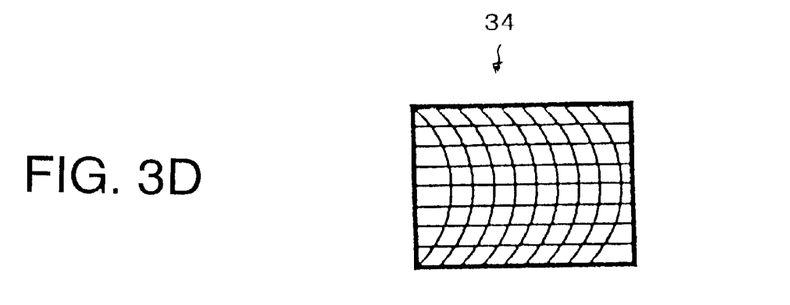
FIG. 3D is a plan view of another grating in the optical guide path device of the embodiment.
Figure 4:
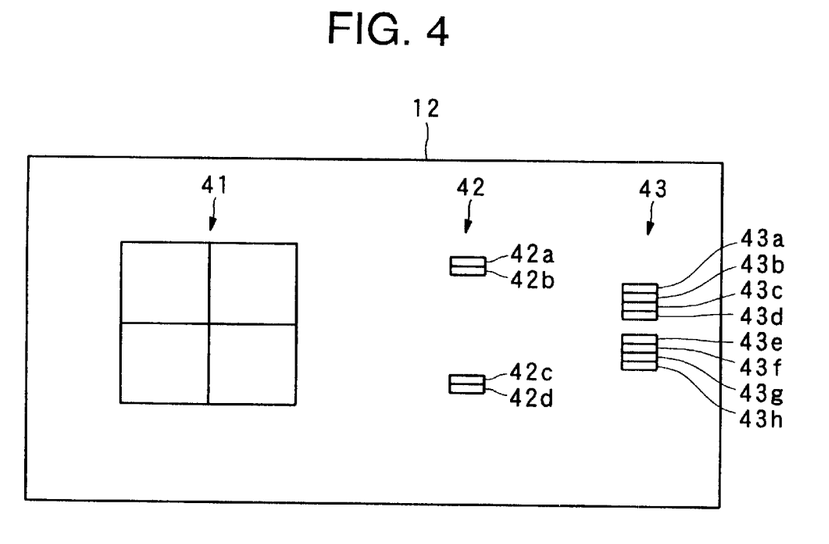
FIG. 4 is a diagram showing the arrangement of each light receiving portion in the optical guide path device of the present embodiment.

Next, the grating patterns of the gratings 31 to 34 and the arrangement of the light receiving portions 41 to 43 in the light guide path device 1 are explained with reference to FIG. 3A to FIG. 3D and FIG. 4. FIG. 3A to FIG. 3D show the grating patterns of the first grating 31 to fourth grating 34 respectively. FIG. 4 shows the arrangement of the first light receiving portion 41, the second light receiving portion 42 and the third light receiving portion 43 in the epitaxial layer 12 in correspondence with the grating patterns. Each of FIG. 3A to FIG. 3D and FIG. 4 is a view viewed from an upper surface of the light guide path device 1, so that the lateral direction of the figures is coincident with the transmission direction of each of the wave guide layer 16, 19 and 22.

The first grating 31 is divided into two areas 31a and 31b, to which grating patterns different in the curvature from each other are respectively applied, in order to perform the focus error detection by means of the beam size method at the second light receiving portion 42. Corresponding to this, as shown in FIG. 4, the second light receiving portion 42 is divided into four areas 42a, 42b, 42c and 42d. As described above, since the slope portion 19a of the second wave guide layer 19 indicated by the dotted line in FIG. 1 is formed, the divided areas 42a and 42b and the divided areas 42c and 42d are disposed away from each other by a predetermined distance.

The curved grating patterns are applied such that, at the time of being coupled to the first wave guide layer 16, the light beam transmitted through the area 31a is collected in the direction toward the divided areas 42a and 42b of the second light receiving portion 42, and the light beam transmitted through the area 31b is collected in the direction toward the divided areas 42c and 42d of the second light receiving portion 42. Also, the curved grating patterns are applied such that, when the focus error is not generated, the difference signal of the divided areas 42a and 42b and the difference signal of the divided areas 42c and 42d are coincident with each other. On the other hand, when the focus error is generated, the difference signals change, so that it is possible to perform the focus error detection on the basis of the comparison thereof.

In the same manner, the second grating 32 is divided into two areas 32a and 32b, to which grating patterns corresponding to the focus error detection by means of the beam size method at the third light detection portion by the same action of the first grating 31 are applied. The structure corresponding to this of the third light receiving portion 43 will be described later.

In each of the areas 31a and 31b of the first grating 31 and the areas 32a and 32b of the second grating 32, a curved grating pattern, which is a chirped grating, is formed so that an appropriate characteristic is given to the light beam.

Further, the third grating 33 as the output-coupler for the light beam having the wavelength of 780 nm is not divided into the areas. To the third grating 33, a longitudinal curved grating pattern is applied. In the third grating 33, the curved grating pattern, which is a chirped grating, is formed so that an appropriate characteristic is given to the light beam.

Next, in the fourth grating 34 as the input-coupler for the light beam having the wavelength of 780 nm, the curved grating pattern in the longitudinal direction and the straight grating pattern in the lateral direction are overlapped and formed. The curved grating in the longitudinal direction is the pattern to input-couple the light beam with the third wave guide layer 22 by the fine adjustment of the pitch and the curvature of the grating as described above. The straight grating pattern in the lateral direction is the diffraction pattern to perform the tracking error detection by means of the 3-beams method at the time of the CD operation.

Here, the principle of the tracking error detection by means of the 3-beams method is explained with reference to FIG. 5A to FIG. 5D.

Figure 5A:
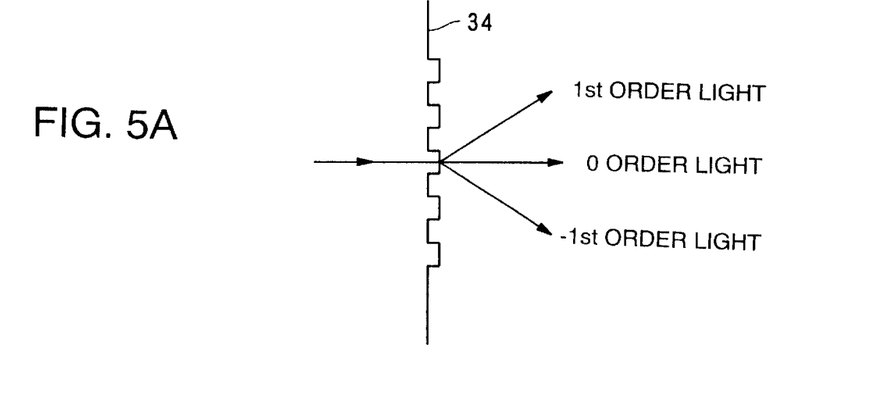
FIG. 5A is a side view of the grating in the embodiment in which optical paths of the light beams are illustrated to explain a detection principle of the 3-beams method.

As shown in FIG. 5A, when the light beam having the wavelength of 780 nm is inputted to the fourth grating 34, it is diffracted by the straight grating pattern, so that the $1^{st}$ order light and the $1^{st}$ order light in addition to the 0 order light are generated and the separated three light beams are transmitted.

Figure 5B:
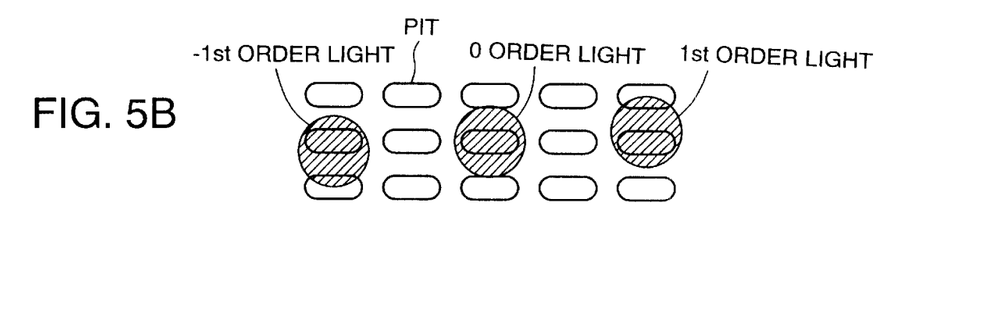
FIG. 5B is a partial plan view of an optical disc in which light beams are illustrated to explain the detection principle of the 3-beams method.
Figure 5C:
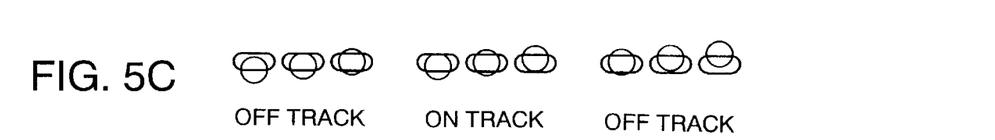
FIG. 5C is a diagram showing conditions of off-track and on-track with respect to a pit on the optical disc to explain the detection principle of the 3-beams method.

As shown in FIG. 5B, the three light beams are adjusted such that the 0 order light is irradiated onto a center of the record track on the information record surface of the CD and that the $1^{st}$ order light and the $1^{st}$ order light are irradiated at positions symmetrically spaced by predetermined distances from the record track. At this time, the irradiation condition of those three beams are changed in correspondence with the direction of the displacement from the record track as shown in FIG. 5C.

Figure 5D:
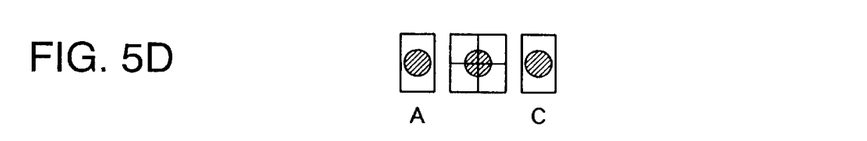
FIG. 5D is a front view of the light receiving portions on which light spots are formed to explain the detection principle of the 3-beams method.

Therefore, if the three beams are received by the light receiving portions arranged as shown in FIG. 5D, the received light amounts of the light receiving portions A and C are changed in correspondence with the displacement of the tracking, so that a difference between those light amounts can be used as a tracking error signal.

In order to cope with the tracking error detection by means of the three beam method as well as the focus error detection by means of the beam size method, the third light receiving portion 43 is divided into division areas 43a to 43h, as shown in FIG. 4. As for the focus error detection, the division areas 43a to 43d and the division areas 43e to 43h are arranged to be spaced from each other in correspondence with the direction in which the light beam passed through the two areas 32a and 32b of the second grating 32 is collected.

Further, the division areas 43a to 43d and the division areas 43e to 43h are arranged such that the division areas 43a and 43e respectively receive the $1^{st}$ order lights, the division areas 43d and 43h respectively receive the $-1^{st}$ order lights, and the division areas 43b, 43c, 43f and 43g respectively receive the 0 order lights, in order to perform the tracking error detection by means of the 3-beams method. By such an arrangement, the tracking error signal can be obtained as a difference between a light received signal of the $1^{st}$ order light and a light received signal of the $-1^{st}$ order light.

The light beam transmitted through the first grating 31 or the second grating 32 is received by the first light receiving portion 41 right underneath thereof. As shown in FIG. 4, the first light receiving portion 41 is a typical 4-divided type detector, which generates the RF signal corresponding to the received light level and also generates the tracking error signal by means of the phase difference method with respect to the light beam having the wavelength of 650 nm.

As described above in detail, the present embodiment is constructed such that the light beam having the wavelength of 780 nm for the CD and the light beam having the wavelength of 650 nm for the DVD are inputted respectively from the light sources separated from each other, and are irradiated onto the information record medium through the optical system positioned at a predetermined direction. Further, it is constructed such that the light beams reflected by the information record medium are guided to the respective light receiving portions, which are input-coupled to the different light guide paths, by the respective gratings. Therefore, it is possible to generate the RF signal, the tracking error signal and the focus error signal in a manner suitable for the CD or DVD. It is also possible to take in all of the functions (to generate those signals) into one integrated light guide path device. Consequently, it is possible to easily miniaturize the optical pickup commonly used for the two different wavelengths by employing a rather simple configuration, and further realize a high reliability of the device.

Next, some examples of an optical pickup having the light guide path device 1 in the above described embodiment are explained with reference to FIG. 6A to FIG. 6C.

Figure 6A:
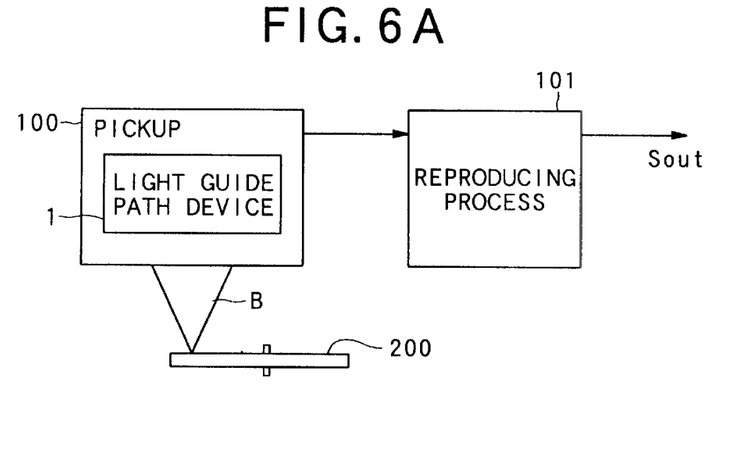
FIG. 6A is a block diagram of an information reproducing system including an optical pickup of the embodiment.

As shown in FIG. 6A, an optical pickup 100 having the light guide path device 1 may be used in an information reproducing system. When reproducing information onto an optical disc 200, which may be a CD or a DVD, a light beam B is emitted from the light guide path device 1, and the reflected light from the optical disc 200 is received by the light guide path device 1. Then, the RF signal outputted from the light guide path device 1 is process by a reproducing process unit 101, and a reproduction signal Sout is outputted from the reproducing process unit 101 while the focusing servo control and the tracking servo control are performed on the basis o the focus error signal and the tracking error signal outputted from the light guide path device 1.

Figure 6B:
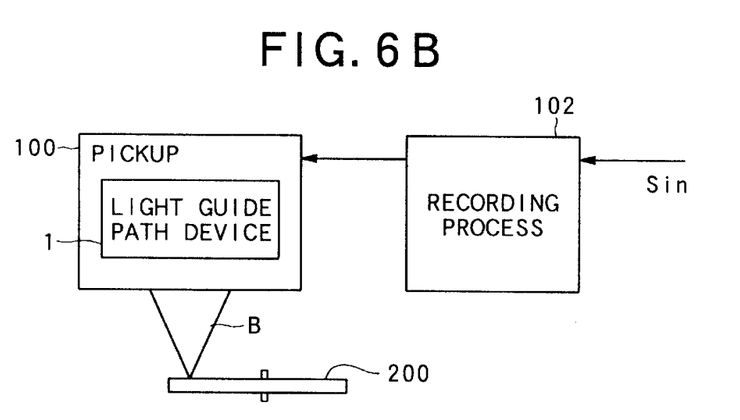
FIG. 6B is a block diagram of an information recording system including an optical pickup of the embodiment.

As shown in FIG. 6B, the optical pickup 100 having the light guide path device 1 may be used in an information recording system. When recording information onto an optical disc 200, which may be a CD or a DVD, a record signal Sin is processed by a recording process unit 102 and the light beam as a recording light beam corresponding to the record signal Sin is emitted from the light guide path device 1 while the focusing servo control and the tracking servo control are performed on the basis o the focus error signal and the tracking error signal outputted from the light guide path device 1.

Figure 6C:
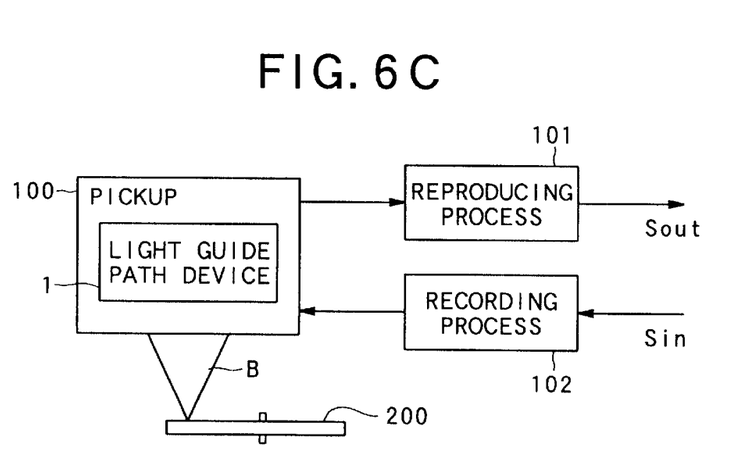
FIG. 6C is a block diagram of an information recording and reproducing system including an optical pickup of the embodiment.

As shown in FIG. 6C, the optical pickup 100 having the light guide path device 1 may be used in an information reproducing and recording system, which includes the reproducing process unit 101 in FIG. 6A and the recording process unit 102 in FIG. 6B, to thereby selectively reproduce and record the information.

The present invention is not limited to the structure of the above described embodiment. For example, in the above embodiment, a case is explained in which the outward-path/inward-path separation film 24, which is laminated on the light wave path device 1, is employed as the first separating device. However, two gratings and wave guide paths constructed in the same manner as the second separating device may be employed as the first separating device. In this case, another wave guide paths are laminated to have the same structure as shown in FIG. 1 on the light guide path device 1. On the upper portion of this wave guide layers, a grating for input-coupling may be equipped at an appropriate position, which corresponds to the position of the light source and is different from the position of the fourth grating 34.

Also, the above embodiment is constructed such that the tracking error detection by means of the 3-beams method is performed with respect to the light beam having the wavelength of 780 nm for the CD. However, it may be constructed such that the tracking error detection is performed by means of the phase difference method at the first light receiving portion 41 comprising the 4-divided type detector, in the same manner as that for the light beam having the wavelength of 650 nm.

Further, the arrangement of the respective light receiving portions 41 to 43 in the above embodiment can be changed. For example, the positions of the second light receiving portion 42 and the third light receiving portion 43 may be exchanged, or they may be arranged in parallel to each other. Furthermore, the first wave guide layer 16 and the second wave guide layer 19 may be exchanged.

In the above embodiment, one of the commonly used wavelengths is 780 nm for the CD while the other is 650 nm for the DVD. It is possible to adapt the present invention to various combinations of two wavelengths other that this.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.Hei11-26235 filed on Feb. 3, 1999 including the specification, claims, drawings and summary is incorporated herein by reference in its entirety.

What is claimed is:

1. A light guide path element comprising:
   a first light guide path for guiding a light beam having a first wavelength;
   a second light guide path for guiding a light beam having a second wavelength;
   a first separating device for irradiating the light beam having the first wavelength irradiated from a first light source onto an information record medium and transmitting a light beam reflected therefrom;
   a second separating device for irradiating the light beam having the second wavelength irradiated from a second light source onto an information record medium and transmitting a light beam reflected therefrom;
   a first grating for input-coupling one portion of the light beam transmitted through said first separating device to said first light guide path and transmitting another portion of the light beam transmitted through said first separating device;
   a second grating for input-coupling one portion of the light beam transmitted through said second separating device to said second light guide path and transmitting another portion of the light beam transmitted through said second separating device;
   a first light receiving portion for receiving the light beam transmitted through said first grating or said second grating;
   a second light receiving portion for receiving the light beam guided by said first light guide path; and
   a third light receiving portion for receiving the light beam guided by said second light guide path.

2. A light guide path element according to claim 1, wherein at least one of said first separating device and said second separating device comprises a light guide path having a grating for input-coupling the light beam and a grating for output-coupling the light beam so as to irradiate the light beam onto said information record medium.

3. A light guide path element according to claim 1, wherein at least one of said first separating device and said second separating device comprises a separation film laminated on said first and second light guide paths for selectively reflecting and transmitting the light beam in correspondence with a phase difference given to the light beam.

4. A light guide path element according to claim 1, wherein said first separating device generates three beams by diffracting the light beam having the first wavelength so that a tracking error signal is generated by use of the three beams on the basis of a light reception output of said third light receiving portion.

5. A light guide path element according to claim 1, wherein each of said first grating and said second grating are divided into two areas so that a focus error signal is generated by a beam size method by the light beam transmitted through one of the two areas and the light beam transmitted through another of the two areas at said second light receiving portion and said third light receiving portion.

6. A light guide path element according to claim 1, wherein the first wavelength is 650 nm and the second wavelength is 780 nm.

7. An optical pickup having a light guide path element, said light guide path element comprising:

a first light guide path for guiding a light beam having a first wavelength;

a second light guide path for guiding a light beam having a second wavelength;

a first separating device for irradiating the light beam having the first wavelength irradiated from a first light source onto an information record medium and transmitting a light beam reflected therefrom;

a second separating device for irradiating the light beam having the second wavelength irradiated from a second light source onto an information record medium and transmitting a light beam reflected therefrom;

a first grating for input-coupling one portion of the light beam transmitted through said first separating device to said first light guide path and transmitting another portion of the light beam transmitted through said first separating device;

a second grating for input-coupling one portion of the light beam transmitted through said second separating device to said second light guide path and transmitting another portion of the light beam transmitted through said second separating device;

a first light receiving portion for receiving the light beam transmitted through said first grating or said second grating;

a second light receiving portion for receiving the light beam guided by said first light guide path; and a third light receiving portion for receiving the light beam guided by said second light guide path, wherein an RF signal is generated on the basis of a light reception output of said first light receiving portion, and a focus error signal is generated on the basis of a light reception output of said second light receiving portion and a light reception output of said third light receiving portion.

8. An optical pickup according to claim 7, wherein at least one of said first separating device and said second separating device comprises a light guide path having a grating for input-coupling the light beam and a grating for output-coupling the light beam so as to irradiate the light beam onto said information record medium.

9. An optical pickup according to claim 7, wherein at least one of said first separating device and said second separating device comprises a separation film laminated on said first and second light guide paths for selectively reflecting and transmitting the light beam in correspondence with a phase difference given to the light beam.

10. An optical pickup according to claim 7, wherein said first separating device generates three beams by diffracting the light beam having the first wavelength so that a tracking error signal is generated by use of the three beams on the basis of a light reception output of said third light receiving portion.

11. An optical pickup according to claim 7, wherein each of said first grating and said second grating are divided into two areas so that a focus error signal is generated by a beam size method by the light beam transmitted through one of the two areas and the light beam transmitted through another of the two areas at said second light receiving portion and said third light receiving portion.

12. An optical pickup according to claim 7, wherein the first wavelength is 650 nm and the second wavelength is 780 nm.

* * * * *